United States Patent
Araki et al.

(10) Patent No.: US 11,942,666 B2
(45) Date of Patent: Mar. 26, 2024

(54) PRECURSOR SHEET FOR FUEL CELL SEPARATOR, AND FUEL CELL SEPARATOR

(71) Applicant: NISSHINBO CHEMICAL INC., Tokyo (JP)

(72) Inventors: Tomoyuki Araki, Chiba (JP); Miho Iwai, Chiba (JP); Takehiro Okei, Chiba (JP); Kosuke Yasuda, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 0 days.

(21) Appl. No.: 18/273,624

(22) PCT Filed: Nov. 30, 2022

(86) PCT No.: PCT/JP2022/044104
§ 371 (c)(1),
(2) Date: Jul. 21, 2023

(87) PCT Pub. No.: WO2023/120065
PCT Pub. Date: Jun. 29, 2023

(65) Prior Publication Data
US 2024/0047705 A1    Feb. 8, 2024

(30) Foreign Application Priority Data

Dec. 20, 2021 (JP) ................. 2021-205641

(51) Int. Cl.
| | | |
|---|---|---|
| *H01M 8/02* | (2016.01) | |
| *H01M 8/0234* | (2016.01) | |
| *H01M 8/0239* | (2016.01) | |
| *H01M 8/0245* | (2016.01) | |

(52) U.S. Cl.
CPC ...... *H01M 8/0245* (2013.01); *H01M 8/0234* (2013.01); *H01M 8/0239* (2013.01)

(58) Field of Classification Search
CPC . H01M 8/0239; H01M 8/0245; H01M 8/0234
USPC ....................................... 429/247
See application file for complete search history.

(56) References Cited

U.S. PATENT DOCUMENTS

| | | | |
|---|---|---|---|
| 2007/0259244 A1 | 11/2007 | Araki et al. | |
| 2009/0072448 A1* | 3/2009 | Shi ............. | H01M 8/0213 264/405 |
| 2009/0130534 A1 | 5/2009 | Otawa et al. | |
| 2010/0159357 A1 | 6/2010 | Otawa et al. | |
| 2011/0053052 A1* | 3/2011 | Braun .......... | H01M 8/0228 429/535 |
| 2012/0077107 A1* | 3/2012 | Lee ............. | H01M 8/0234 429/535 |
| 2016/0197360 A1* | 7/2016 | Ihm ............ | H01M 8/0245 264/328.18 |

FOREIGN PATENT DOCUMENTS

| | | |
|---|---|---|
| JP | 2006-127812 A | 5/2006 |
| JP | 2007-042326 A | 2/2007 |
| JP | 2007-122884 A | 5/2007 |
| JP | 2007-280725 A | 10/2007 |
| JP | 2007-311061 A | 11/2007 |
| JP | 2008-311176 A | 12/2008 |
| JP | 2014-032906 A | 2/2014 |
| JP | 2021-180150 A | 11/2021 |

OTHER PUBLICATIONS

International Search Report dated Feb. 7, 2023, issued in counterpart International Application No. PCT/JP2022/044104, with English translation. (5 pages).
Written Opinion dated Feb. 7, 2023, issued in counterpart International Application No. PCT/JP2022/044104. (3 pages).
Decision to Grant a Patent dated Mar. 8, 2022, issued in counterpart JP Application No. 2021-205641, with English translation. (5 pages).

* cited by examiner

*Primary Examiner* — James M Erwin
(74) *Attorney, Agent, or Firm* — WHDA, LLP

(57) ABSTRACT

This precursor sheet for a fuel cell separator comprises a conductive substrate sheet, a dense layer including first graphite particles, and a conduction layer including second graphite particles, wherein the dense layer and the conduction layer include a resin, the first graphite particles have a volume resistivity of 20 mΩ·cm or greater and a bulk density of 1.7 g/cm$^3$ or greater when compressed at 30 MPa, and the second graphite particles have a volume resistivity of less than 20 mΩ·cm and a bulk density of 1.5 g/cm$^3$ or greater when compressed at 30 MPa. This precursor sheet for a fuel cell separator provides a fuel cell separator that has excellent shapability and good mechanical strength, conductivity, and gas impermeability.

22 Claims, No Drawings

PRECURSOR SHEET FOR FUEL CELL SEPARATOR, AND FUEL CELL SEPARATOR

TECHNICAL FIELD

The present invention relates to a precursor sheet for fuel cell separator and a fuel cell separator.

BACKGROUND ART

Fuel cell separator plays a role of imparting electroconductivity to the individual unit cells, a role of reserving a passage for a fuel and air (oxygen) to be fed to the unit cells, and as a separation boundary wall between the unit cells.

In general, characteristics required for the fuel cell separator are exemplified by gas (hydrogen and oxygen) impermeability, electroconductivity, mechanical strength, durability (heat resistance, water resistance, acid resistance), thin and lightweight, and formability.

As a conventional method for producing a fuel cell separator, a method of mixing carbon particles and a resin and compression-molding the mixture (so-called compound) is known, but the separator obtained by this production method has problems in terms of gas impermeability and mechanical strength while being lightweight and excellent in electroconductivity, durability, and formability.

As means for solving this problem, a method of enclosing a metal mesh, a method of mixing a fibrous material, a method of using a paper sheet containing a fibrous material, and the like have been devised.

For example, Patent Document 1 discloses a fuel cell separator obtained by press-molding a preform configured by interposing a second sheet obtained by applying a thermosetting resin to graphite between a pair of first sheets obtained by papermaking a raw material obtained by adding a fibrous filler to expanded graphite.

Patent Document 2 discloses a fuel cell separator obtained by press-molding a pre-laminate obtained by interposing a first sheet obtained by papermaking a raw material in which a fibrous filler is added to expanded graphite between a pair of second sheets obtained by applying a thermosetting resin to graphite.

Patent Document 3 discloses a fuel cell separator obtained by molding an electroconductive sheet having a structure in which a resin layer containing a matrix resin and an electroconductive powder and not containing an electroconductive fiber is laminated on at least one surface of a paper sheet containing a matrix resin, an electroconductive fiber, and an electroconductive powder.

In addition, a method of utilizing graphite particles having a specific shape and physical properties is also devised. For example, Patent Document 4 discloses a separator for fuel cell having a first layer and a second layer containing graphite particulates and each having a metal impurity content adjusted to a predetermined range, in which the thickness of the first layer is 1.5 times or more the mean particle size of the graphite particulates, the graphite particulates contained in the first layer have a spherical shape or an outer shape with an aspect ratio of less than 2.0, and the graphite particulates contained in the second layer have an outer shape with an aspect ratio of 2.0 or more.

Patent Document 5 discloses a fuel cell separator obtained by molding a composition which contains at least one type of particle group with an average particle size of 25 to 100 μm and a powder resistance under a pressure of 30 MPa of 3.0 mΩcm or less, contains graphite particles having a true specific gravity within a range of 2.24 to 2.27 and a resin component, has a powder resistance under a pressure of 30 MPa in the entire graphite particles of 3.0 mΩcm or less, and has a solid content ratio of the graphite particles of 70 to 80% by weight.

Patent Document 6 discloses a separator for fuel cell including a first electroconductive layer and a second electroconductive layer containing a carbon material and a resin material, in which the second electroconductive layer contains two kinds of carbon particles exposed from the resin material and having different particle sizes.

However, in the fuel cell separator of Patent Document 1, the sheet obtained by papermaking expanded graphite and a fibrous filler has been used for the surface layer in order to increase gas impermeability and mechanical strength, but there is a possibility that the fibrous material is exposed on the surface, and it is difficult to realize formability and electroconductivity such as high surface smoothness.

In the fuel cell separator of Patent Document 2, a layer composed of graphite and a thermosetting resin is used as a surface layer in order to enhance formability, but there is no description of specific requirements therefor, and it cannot be said that a high degree of formability can be realized only with this configuration.

In the fuel cell separator of Patent Document 3, in order to improve the appearance and reduce the contact resistance of the surface, a resin layer containing a matrix resin and an electroconductive powder and not containing an electroconductive fiber is molded to serve as the surface, but it cannot be said that sufficient gas impermeability can be secured only with this structure.

In the fuel cell separator of Patent Document 4, a graphite layer is formed of graphite with different aspect ratios, and spherical graphite with a small aspect ratio is used as an outermost surface, thereby enhancing fluidity and suppressing exposure of an inner layer and outflow of metal components. However, no mention is made of gas impermeability by this configuration, and it is difficult to consider that a dense layer having sufficient gas impermeability can be formed even from the fact that the particle size of graphite is 50 to 500 μm.

In the fuel cell separator of Patent Document 5, electroconductivity is improved using graphite particles containing at least one type of particle group having a powder resistance of 3.0 mΩ·cm or less under a pressure of 30 MPa, but no mention is made of gas impermeability.

In the fuel cell separator of Patent Document 6, it is said that the deterioration of electroconductivity is suppressed by the two-layer structure, and drainability is enhanced by irregularities formed on the surface layer, but no specific effect or gas impermeability is mentioned.

Furthermore, in the techniques of Patent Documents 1 to 4, since sheets once formed for each layer are laminated, the process is complicated and the productivity is low, and moreover, followability (formability) to a molding die shape (uneven shape) has not been sufficiently studied.

As described above, the fuel cell separator obtained in each of the above patent documents has good mechanical strength, but there is room for improvement in terms of gas impermeability and the like, and there is also a problem in that formability is low.

PRIOR ART DOCUMENTS

Patent Documents

Patent Document 1: JP-A 2007-280725
Patent Document 2: JP-A 2007-311061

Patent Document 3: JP-A 2007-122884
Patent Document 4: JP-A 2008-311176
Patent Document 5: JP-A 2014-032906
Patent Document 6: JP-A 2021-180150

SUMMARY OF INVENTION

Technical Problem

The present invention has been made in view of such circumstances, and an object of the present invention is to provide a precursor sheet for fuel cell and a fuel cell separator that provide a fuel cell separator excellent in formability and excellent in mechanical strength, electroconductivity, and gas impermeability.

Solution to Problem

As a result of intensive studies to achieve the above object, the present inventors have found that a precursor sheet for fuel cell separator including at least three layers of an electroconductive substrate sheet, a dense layer containing graphite particles having a predetermined bulk density and volume resistivity and a resin, and an electroconductive layer containing graphite particles having a predetermined bulk density and volume resistivity provides a fuel cell separator excellent in formability and excellent in mechanical strength, electroconductivity, and gas impermeability, and have completed the present invention.

That is, the present invention provides:

1. A precursor sheet for fuel cell separator including:
   an electroconductive substrate sheet, a dense layer containing first graphite particles, and an electroconductive layer containing second graphite particles,
   wherein the dense layer and the electroconductive layer contain a resin,
   the first graphite particles have a bulk density of 1.7 g/cm$^3$ or more and a volume resistivity of 20 mΩ·cm or more when compressed at 30 MPa, and
   the second graphite particles have a bulk density of 1.5 g/cm$^3$ or more and a volume resistivity of less than 20 mΩ·cm when compressed at 30 MPa;

2. The precursor sheet for fuel cell separator according to 1, wherein the electroconductive layer is laminated on one surface of the substrate sheet, and the dense layer is laminated on a surface of the electroconductive layer;

3. The precursor sheet for fuel cell separator according to 2, wherein the electroconductive layer is laminated on each of both side surfaces of the substrate sheet, and the dense layer is laminated on each of the surfaces of the electroconductive layers;

4. The precursor sheet for fuel cell separator according to any one of 1 to 3, wherein the first graphite particles are flat graphite with an average particle size of 1 to 30 μm;

5. The precursor sheet for fuel cell separator according to 4, wherein the first graphite particles are flat graphite with a bulk density of 1.7 to 1.9 g/cm$^3$ and a volume resistivity of 20 to 30 mΩ·cm when compressed at 30 MPa;

6. The precursor sheet for fuel cell separator according to any one of 1 to 5, wherein the second graphite particles are graphite having an isotropic shape with an average particle size of 5 to 50 μm;

7. The precursor sheet for fuel cell separator according to 6, wherein the second graphite particles are spherical graphite with a bulk density of 1.5 to 1.9 g/cm$^3$ and a volume resistivity of 10 mΩ·cm or less when compressed at 30 MPa;

8. The precursor sheet for fuel cell separator according to any one of 1 to 7, wherein the dense layer has a thickness of 5 to 30 μm;

9. The precursor sheet for fuel cell separator according to any one of 1 to 8, wherein the electroconductive layer has a thickness of 10 to 200 μm;

10. The precursor sheet for fuel cell separator according to any one of claims 1 to 9, wherein the resin of either or both of the electroconductive layer and the dense layer contains a thermosetting resin;

11. The precursor sheet for fuel cell separator according to any one of 1 to 10, wherein the resin of the electroconductive layer contains an aqueous resin;

12. The precursor sheet for fuel cell separator according to any one of 1 to 11, wherein the substrate sheet contains a resin;

13. The precursor sheet for fuel cell separator according to 12, wherein the resin of the substrate sheet contains a thermosetting resin;

14. The precursor sheet for fuel cell separator according to 10 or 13, wherein the thermosetting resin is contained in an amount of 10 to 25% by weight in the entire precursor sheet for fuel cell separator;

15. The precursor sheet for fuel cell separator according to any one of 1 to 14, wherein the substrate sheet is a paper sheet containing organic fibers and graphite;

16. A fuel cell separator obtained by molding the precursor sheet for fuel cell separator according to any one of 1 to 15;

17. The fuel cell separator according to 16, wherein the dense layer has a thickness of the entire dense layer after molding of 15% or less of a total thickness;

18. The fuel cell separator according to 16 or 17, wherein the electroconductive layer has a thickness per layer after molding of 20 to 150 μm;

19. A fuel cell including the fuel cell separator according to any one of 16 to 18;

20. A method for manufacturing a precursor sheet for fuel cell separator including an electroconductive substrate sheet, a dense layer containing first graphite particles, and an electroconductive layer containing second graphite particles, the method including the steps of:
   applying a composition for forming an electroconductive layer containing the second graphite particles and a resin to at least one surface of the substrate sheet or a surface of the dense layer to form the electroconductive layer; and
   applying a composition for forming a dense layer containing the first graphite particles and a resin to at least one surface of the substrate sheet or a surface of the electroconductive layer to form the dense layer,
   wherein the first graphite particles have a bulk density of 1.7 g/cm$^3$ or more and a volume resistivity of 20 mΩ·cm or more when compressed at 30 MPa, and
   the second graphite particles have a bulk density of 1.5 g/cm$^3$ or more and a volume resistivity of less than 20 mΩ·cm when compressed at 30 MPa;

21. The method for manufacturing a precursor sheet for fuel cell separator according to including the steps of applying the composition for forming an electroconductive layer to both surfaces of the substrate sheet to form two electroconductive layers; and applying the composition for forming a dense layer to the respective surfaces of the two electroconductive layers to form two dense layers; and 22. A method for manufacturing a fuel cell separator, including compression-molding the precursor sheet obtained by the method for manufacturing a precursor sheet for fuel cell separator according to 20 or 21.

Advantageous Effects of Invention

Since the precursor sheet for fuel cell separator of the present invention includes an electroconductive substrate sheet, mechanical strength and electroconductivity can be improved, and since the precursor sheet for fuel cell separator includes an electroconductive layer made of graphite having high fluidity, formability and electroconductivity can be improved, and since the precursor sheet for fuel cell separator includes a dense layer, gas impermeability and surface smoothness can be improved, and further exposure of the substrate sheet can be prevented.

In addition, since the electroconductive layer and the dense layer can be formed on the electroconductive substrate sheet by a coating method, a precursor sheet can be prepared by roll-to-roll method, and productivity is high.

Furthermore, by forming an electroconductive substrate sheet, an electroconductive layer, and a dense layer, a separator having advanced characteristics such as mechanical strength, electroconductivity, gas impermeability, and formability can be obtained.

DESCRIPTION OF EMBODIMENTS

Hereinafter, the present invention is described in more detail.

A precursor sheet for fuel cell separator according to the present invention includes an electroconductive substrate sheet, a dense layer containing first graphite particles, and an electroconductive layer containing second graphite particles, wherein the dense layer and the electroconductive layer contain a resin, the first graphite particles have a bulk density of 1.7 g/cm$^3$ or more and a volume resistivity of 20 mΩ·cm or more when compressed at 30 MPa, and the second graphite particles have a bulk density of 1.5 g/cm$^3$ or more and a volume resistivity of less than 20 mΩ·cm when compressed at 30 MPa.

[1] Dense Layer

The dense layer constituting the precursor sheet for fuel cell separator (hereinafter, it is abbreviated as a "precursor sheet".) of the present invention contains the first graphite particles and the resin, and mainly functions as a gas impermeable layer.

In the precursor sheet of the present invention, as the first graphite particles, those with a bulk density of 1.7 g/cm$^3$ or more, preferably 1.7 to 1.9 g/cm$^3$, and a volume resistivity of 20 mΩ·cm or more, preferably 20 to 30 mΩ·cm, more preferably 22 to 28 mΩ·cm when compressed at 30 MPa are used. Graphite particles within this range have appropriate anisotropy, filling property, and fluidity, so that characteristics such as gas impermeability, electroconductivity, and surface smoothness (reduction of contact resistance) can be imparted to a fuel cell separator including a dense layer containing the graphite particles.

The shape of the first graphite particles is not particularly limited, but flat graphite particles are preferable instead of spherical graphite particles because particles having a certain degree of anisotropy or more are suitable for forming the dense layer. The flat graphite particles have a basal surface on which a carbon hexagonal net surface appears and an edge surface on which an end portion of the carbon hexagonal net surface appears. The flat graphite particles are exemplified by flake graphite, vein graphite, amorphous graphite, flaky graphite, kish graphite, pyrolytic graphite, and highly oriented pyrolytic graphite. Among these flat graphite particles, flaky graphite and kish graphite excellent in anisotropy and surface smoothness are preferable, and flaky graphite is more preferable.

In addition, the average particle size of the first graphite particles is not particularly limited, but is preferably 1 to 30 μm, and more preferably 1 to 15 μm because particles having a small particle size are suitable for forming the dense layer. The average particle size in the context of the present invention means median diameter ($d_{50}$) measured by particle size distribution analysis based on laser diffractometry (the same applies hereinafter).

The first graphite particles may be natural graphite or artificial graphite as long as the above characteristics are satisfied.

The resin contained in the dense layer may be a thermoplastic resin or a thermosetting resin, but preferably contains a thermosetting resin, and more preferably contains only a thermosetting resin.

The thermoplastic resin is preferably any of resins having a melting point or a glass transition point of 100° C. or higher from the viewpoint of heat resistance, but not specifically limited thereto.

Specific examples thereof include polyethylene, polypropylene, polyphenylene sulfide, polytetrafluoroethylene, tetrafluoroethylene-ethylene copolymer, polychlorotrifluoroethylene, polyamide, polyetherketoneetherketoneketone, polyetherketone, liquid crystal polymer, polyimide, polyamideimide, polyphenylsulfone, polyetherimide and polysulfone, polybutylene terephthalate, polyethylene naphthalate, ABS resin, polycycloolefin and polyethersulfone, and derivatives thereof having a melting point of 100° C. or higher, polycarbonate, polystyrene and polyphenylene oxide, and derivatives thereof having a glass transition point of 100° C. or higher, and these may be used alone or in combination of two or more thereof. Although the upper limit of the melting point or glass transition point is not specifically limited, it is preferably 300° C. or lower, from the viewpoint of productivity of the precursor sheet and the fuel cell separator.

The thermosetting resin is not particularly limited, and can be appropriately selected from those conventionally widely used as binder resins such as carbon separators.

Specific examples thereof include a phenol resin, an epoxy resin, a furan resin, an unsaturated polyester resin, a urea resin, a melamine resin, a diallyl phthalate resin, a bismaleimide resin, a polycarbodiimide resin, a silicone resin, a vinyl ester resin, and a benzoxazine resin, and these may be used alone or in combination of two or more thereof. Among them, an epoxy resin is preferable because it is excellent in heat resistance and mechanical strength.

The content ratio between the first graphite particles and the resin is not particularly limited, but from the viewpoint of imparting characteristics such as gas impermeability, electroconductivity, and surface smoothness (reduction in contact resistance) to the obtained fuel cell separator, the content of the resin is preferably 5 to 50 parts by weight and more preferably 10 to 35 parts by weight with respect to 100 parts by weight of the first graphite particles, and in the case of a thermosetting resin, it is preferable that the thermosetting resin is contained in an amount of 10 to 25% by weight in the entire precursor sheet.

The dense layer may further contain a conduction auxiliary, aiming at reducing resistivity of the obtained fuel cell separator.

The conduction auxiliary is exemplified by carbon black, graphene, carbon fiber, carbon nanofiber, carbon nanotube, various metal fibers, and inorganic and organic fibers on which metal is deposited or plated, and these may be used alone or in combination of two or more thereof. Among them, carbon materials having a small particle size such as carbon black and graphene are preferable from the viewpoint of maintaining surface smoothness.

The carbon black is exemplified by furnace black, acetylene black, Ketjen black, and channel black, and furnace black is preferable from the viewpoint of cost.

The carbon fiber is exemplified by polyacrylonitrile (PAN)-based carbon fiber derived from PAN fiber, pitch-based carbon fiber derived from pitches such as petroleum pitch, and phenol-based carbon fiber derived from phenolic resin. PAN-based carbon fiber is preferable from the viewpoint of cost.

The fibrous conduction auxiliary preferably has an average fiber length of 0.1 to mm, from the viewpoint of balancing moldability and electroconductivity, which is more preferably 0.1 to 7 mm, and even more preferably 0.1 to 5 mm. The average fiber diameter is preferably 3 to 50 μm from the viewpoint of moldability, which is more preferably 3 to 30 μm, and even more preferably 3 to 15 μm.

The content of the conduction auxiliary in the dense layer is preferably 0.1 to 10% by weight, and more preferably 0.5 to 7% by weight.

Besides the aforementioned ingredients, the dense layer may contain other ingredient commonly used for the fuel cell separator.

Such other ingredient is exemplified by internal mold releasing agents such as stearate-based wax, amide-based wax, montanate-based wax, carnauba wax and polyethylene wax; surfactants such as anionic, cationic and nonionic ones; strong acid; strong electrolyte; base; known flocculants suited to polyacrylamide-based, sodium polyacrylate-based and polymethacrylate-based surfactants; and thickeners such as carboxymethyl cellulose, starch, vinyl acetate, polylactic acid, polyglycolic acid and polyethylene oxide.

The dense layer can be formed by applying a composition for forming a dense layer containing the first graphite particles, a resin, and other additives such as a conduction auxiliary to be used as necessary, and a solvent onto a base layer (substrate sheet or electroconductive layer). In addition, the dense layer can be formed by impregnating a layer formed by applying a composition containing the first graphite particles and a solvent onto the base layer with a resin.

The solvent is not particularly limited as long as the coatable composition can be prepared, but is exemplified by water; aliphatic hydrocarbon-based solvents such as pentane, hexane, and heptane; aromatic hydrocarbon-based solvents such as toluene, p-xylene, o-xylene, m-xylene, and ethylbenzene; ketone-based solvents such as acetone, methyl ethyl ketone, methyl isopropyl ketone, diethyl ketone, methyl isobutyl ketone, methyl n-butyl ketone, cyclopentanone, and cyclohexanone; ester-based solvents such as ethyl acetate, isopropyl acetate, n-propyl acetate, isobutyl acetate, and n-butyl acetate; and aliphatic alcohol-based solvents such as methanol, ethanol, n-propanol, isopropanol, n-butanol, isobutanol, t-butanol, 1-pentanol, 1-hexanol, and cyclohexanol; ether-based solvents such as diethyl ether, tetrahydrofuran, and 1,4-dioxane, and amide-based solvents such as N,N-dimethylformamide, N,N-dimethylacetamide (DMAc), and N-methylpyrrolidone; cyclic urea-based solvents such as 1,3-dimethyl-2-imidazolidinone and 1,3-dimethyl-3,4,5,6-tetrahydro-2(1H)-pyrimidinone, and dimethyl sulfoxide, and these may be used alone or in combination of two or more.

The coating method is not particularly limited, and may be appropriately selected from known methods such as a spin coating method, a dipping method, a flow coating method, an inkjet method, a jet dispenser method, a spray method, a bar coating method, a gravure coating method, a roll coating method, a transfer printing method, a brush coating method, a blade coating method, an air knife coating method, and a die coating method.

When a solvent is used, the temperature at which the solvent is removed cannot be generally defined because it varies depending on the solvent used, and the temperature is required to be lower than the melting point or the like of the thermoplastic resin or the curing start temperature of the thermosetting resin, but the temperature can be generally about room temperature to 150° C., and is more preferably about 50 to 130° C.

The thickness of the dense layer constituting the precursor sheet is not particularly limited, but is preferably 5 to 30 μm and more preferably 5 to 20 μm per layer in consideration of the balance between gas impermeability and smoothness, and electroconductivity.

[2] Electroconductive Layer

The electroconductive layer constituting the precursor sheet of the present invention contains second graphite particles and a resin, and mainly imparts formability (mold shape followability) to the precursor sheet and imparts electroconductivity to the fuel cell separator.

In the precursor sheet of the present invention, as the second graphite particles, those with a bulk density of 1.5 g/cm$^3$ or more, preferably 1.5 to 1.9 g/cm$^3$, more preferably 1.6 to 1.9 g/cm$^3$, and a volume resistivity of less than 20 mΩ·cm, preferably mΩ·cm or less, more preferably 9 mΩ·cm or less when compressed at 30 MPa are used. Graphite particles within this range have high isotropy, fluidity, and electroconductivity, so that formability can be imparted to the precursor sheet, and characteristics such as good electroconductivity can be imparted to the fuel cell separator.

On the other hand, the volume resistivity is preferably 3.5 mΩ·cm or more, and more preferably 5 mΩ·cm or more, from the viewpoint of imparting high fluidity and enhancing uniformity in the electroconductive layer. Since the graphite particles within this range have an appropriate particle size and particle size distribution, the formability and electroconductivity of the precursor sheet can be further enhanced.

The shape of the second graphite particles is not particularly limited, but graphite particles having an isotropic shape are preferable, and spherical graphite particles are more preferable since particles having fluidity are suitable for forming the electroconductive layer.

Also, the average particle size of the second graphite particles is not particularly limited, but is preferably 5 to 50 μm, more preferably 5 to 30 μm, and is preferably larger than the average particle size of the graphite particles constituting the dense layer.

The second graphite particles may be natural graphite or artificial graphite as long as they satisfy the above characteristics.

The resin contained in the electroconductive layer may be a thermoplastic resin or a thermosetting resin, but preferably contains a thermosetting resin. Specific examples of the thermoplastic resin and the thermosetting resin include those similar to the resins exemplified for the dense layer.

The electroconductive layer can be formed by applying a composition for forming an electroconductive layer containing the second graphite particles, a resin, and other additives such as a conduction auxiliary to be used as necessary, and a solvent onto a base layer (substrate sheet or dense layer). In addition, the electroconductive layer can be formed by impregnating a layer formed by applying a composition containing the second graphite particles and a solvent onto the base layer with a resin.

Also at the time of forming the electroconductive layer, the solvent, coating method, and solvent removal temperature described in the dense layer can be adopted.

The composition for forming an electroconductive layer preferably contains a binder resin having thickening properties and adhesive properties from the viewpoint of obtaining a predetermined thickness and uniformity at the time of application. As the binder resin, an aqueous resin is more preferable because thickening properties and adhesive properties can be obtained with a small amount and the solvent can be easily removed.

The aqueous resin is not particularly limited, and specific examples thereof include aqueous resins such as an acrylic resin, a polyurethane resin, a polyester resin, a to polyolefin resin, a polyvinyl resin, a polyether resin, a polyamide resin, a polyimide resin, a polyallylamine resin, a phenol resin, an epoxy resin, a phenoxy resin, a urea resin, a melamine resin, an alkyd resin, a formaldehyde resin, a silicone resin, a fluororesin, and polysaccharides such as carboxymethyl cellulose, aqueous emulsions obtained by emulsion polymerization, and dispersions, and these may be used alone or in combination of two or more thereof. Among them, an acrylic resin, a polyvinyl resin, a polyether resin, and polysaccharides such as carboxymethyl cellulose, which can obtain sufficient adhesive properties particularly in a small amount, are preferable. The content of the binder resin is not particularly limited, but is preferably 0.1 to 10% by weight, and more preferably 0.5 to 7% by weight in the electroconductive layer. When the content is less than 0.1% by weight, there is a possibility that thickening properties and adhesive properties are insufficient, and when the content is 10% by weight or more, there is a possibility that electroconductivity is reduced.

The content ratio between the second graphite particles and the resin is not particularly limited, but is preferably 5 to 50 parts by weight, more preferably 10 to 35 parts by weight of the resin, with respect to 100 parts by weight of the second graphite particles, in consideration of the formability of the precursor sheet described above, and the electroconductivity of the fuel cell separator. In the case of the thermosetting resin, it is preferable that the thermosetting resin is contained in an amount of 10 to 25% by weight in the entire precursor sheet.

The electroconductive layer may further contain a conduction auxiliary, aiming at reducing resistivity of the obtained fuel cell separator. Specific examples of the conduction auxiliary include those similar to those exemplified for the dense layer.

The content of the conduction auxiliary in the electroconductive layer is preferably to 10% by weight, and more preferably 0.5 to 7% by weight.

In addition, the electroconductive layer may contain other components exemplified in the dense layer.

The thickness of the electroconductive layer constituting the precursor sheet is not particularly limited, but is preferably 10 to 200 μm and more preferably 30 to 150 μm per layer in consideration of the balance between formability and electroconductivity.

[3] Substrate Sheet

The electroconductive substrate sheet constituting the precursor sheet of the present invention is not particularly limited, and may be appropriately selected from those conventionally used as a precursor sheet for fuel cell separator such as a paper sheet, a carbon fiber sheet, a carbon fiber-reinforced carbon composite material sheet, a metal foil, and a metal mesh containing an electroconductive filler and an organic fiber, and a paper sheet containing an electroconductive filler and an organic fiber is preferable.

The electroconductive filler constituting the substrate sheet is not specifically limited, and any known materials having been used for the fuel cell separator are employable. Specific examples thereof include carbon materials; metal powders; and inorganic or organic powders on which metal is deposited by evaporation or plating, and carbon material is preferable.

The carbon material is exemplified by graphites such as natural graphite, synthetic graphite obtained by baking needle coke, synthetic graphite obtained by baking lump coke, and expandable graphite obtained by chemical treatment of natural graphite; crushed carbon electrode; coal pitch; petroleum pitch; coke; activated carbon; glassy carbon; acetylene black; and Ketjen black, and among them, graphite is preferable from the viewpoint of electroconductivity.

The electroconductive filler may be used singly or in combination of two or more kinds thereof.

The shape of the electroconductive filler is not limited, and may be any of sphere, scale, lump, foil, plate, needle and irregular shape. From the viewpoint of gas impermeability of the separator, a scaly shape is preferable.

The electroconductive filler preferably has an average particle size of 5 to 200 μm, which is more preferably 10 to 80 μm. With the average particle size of the electroconductive filler within the aforementioned ranges, a necessary level of electroconductivity is obtainable while retaining gas impermeability.

The content of the electroconductive filler in the substrate sheet is preferably 50 to 96% by weight, and more preferably 60 to 90% by weight. With the content of the electroconductive filler controlled within the aforementioned ranges, a necessary level of electroconductivity is obtainable without damaging the formability.

On the other hand, the organic fiber preferably has a melting point higher than the heating temperature at the time of manufacturing the fuel cell separator. By using such organic fiber (also referred to as a "first organic fiber", hereinafter), it now becomes possible to improve mechanical strength of the precursor sheet and the fuel cell separator precursor obtainable therefrom.

The material of the first organic fiber is exemplified by aramids such as poly-p-phenylene terephthalamide (decomposition temperature: 500° C.) and poly-m-phenylene isophthalamide (decomposition temperature: 500° C.), polyacrylonitrile (melting point: 300° C.), cellulose (melting point: 260° C.), acetate (melting point: 260° C.), nylon polyester (melting point: 260° C.), polyphenylene sulfide (PPS) (melting point: 280° C.), polyetheretherketone (melting point: 340° C.), polyphenylsulfone (no melting point), polyamideimide (melting point: 300° C.), polyetherimide (melting point: 210° C.), and copolymers containing these materials as main materials, and these may be used alone or in combination of two or more. These can be appropriately selected in consideration of the formability of the precursor sheet, and the mechanical strength, electroconductivity, and durability of the separator.

In addition, the organic fiber may contain a second organic fiber having a melting point lower than a heating temperature at the time of manufacturing the fuel cell separator.

The second organic fiber preferably has affinity to a resin contained in the dense layer and the electroconductive layer. Materials for composing the second organic fiber is preferably polyethylene (PE) (melting point=120 to 140° C. (HDPE), 95 to 130° C. (LDPE), polypropylene (PP) (melting point=160° C.), and polyphenylene sulfide, and these may be used alone or in combination of two or more.

When the second organic fiber is contained, the first organic fiber preferably has a melting point 10° C. or more higher than the aforementioned heating temperature, from the viewpoint of reliably retaining the fiber shape necessary for imparting impact resistance, which is more preferably higher by 20° C. or more, and even more preferably higher by 30° C. or more.

On the other hand, the second organic fiber preferably has a melting point 10° C. or more lower than the aforementioned heating temperature, from the viewpoint of moldability, which is more preferably lower by 20° C. or more, and even more preferably lower by 30° C. or more.

Difference between the melting points of the first and second organic fibers is preferably 40° C. or larger, and more preferably 60° C. or larger.

When the second organic fiber is contained, the first organic fiber is preferably aramid, polyacrylonitrile, cellulose, acetate or nylon-polyester, meanwhile the second organic fiber is preferably PE, PP or PPS. Note that, in a case where PE or PP is used as the second organic fiber, it is acceptable to use, as the first organic fiber, aramid, polyacrylonitrile, cellulose, acetate or nylon-polyester, which may even be PPS as well.

The organic fiber preferably has an average fiber length of 0.1 to 10 mm, from the viewpoint of stabilizing grammage during paper making, and of keeping mechanical strength of the obtainable paper sheet, which is more preferably 0.1 to 6 mm, and even more preferably 0.5 to 6 mm.

The first and second organic fibers preferably have an average fiber diameter of to 100 μm from the viewpoint of moldability, which is more preferably 0.1 to 50 μm, and even more preferably 1 to 50 μm.

Note that the average fiber length and average fiber diameter in the present invention are arithmetic average values of fiber length and fiber diameter of 100 fibers measured under an optical microscope or electron microscope.

The content of the organic fiber in the substrate sheet is preferably 1 to 20% by weight, and more preferably 3 to 15% by weight.

Also, the content of the second organic fiber, when contained, is preferably 10 to 80% by weight, and more preferably 50 to 80% by weight.

The paper sheet may further contain a conduction auxiliary, aiming at reducing resistivity of the fuel cell separator obtainable therefrom. Specific examples of the conduction auxiliary include those similar to those exemplified for the dense layer, but carbon fibers are preferable, and PAN-based carbon fiber is more preferable.

The content of the conduction auxiliary in the paper sheet is preferably 1 to 20% by weight, and more preferably 2 to 10% by weight.

Also, the paper sheet may contain other components exemplified in the dense layer.

The paper sheet can be obtained by papermaking a composition containing the aforementioned individual ingredients.

Method of paper making may be any of known methods without special limitation. For example, the paper sheet may be manufactured by dispersing a composition containing the aforementioned individual ingredients into a solvent such as water unable to dissolve them, by allowing the obtained dispersion to deposit the ingredients on a substrate, and then by drying the obtained deposit.

The grammage of the paper sheet is preferably 150 to 300 g/m$^2$.

The thickness of the substrate sheet used in the present invention is not particularly limited, but is preferably 10 μm to 1.0 mm in consideration of the mechanical strength and the like of the fuel cell separator.

When the substrate sheet is a porous sheet such as a paper sheet, the substrate sheet may contain a resin.

The resin contained in the substrate sheet may be a thermoplastic resin or a thermosetting resin, but is preferably a thermosetting resin. Specific examples of the thermoplastic resin and the thermosetting resin include those similar to the resins exemplified for the dense layer, but in the case of the thermosetting resin, it is preferable that the thermosetting resin is contained in an amount of 10 to 25% by weight in the entire precursor sheet.

The method of incorporating the resin into the substrate sheet is exemplified by a method in which the resin film is heated and melted to be impregnated, and a method in which the substrate sheet is immersed in the liquid resin to be impregnated.

After all of the dense layer, the electroconductive layer, and the substrate sheet are laminated, a resin may be impregnated, or a resin may be contained in a composition for forming the dense layer and the electroconductive layer, and a lower layer thereof may be impregnated with the resin when applying the composition. For example, when a dense layer is formed on the outermost surface, a laminate of a substrate sheet and an electroconductive layer is prepared, and then a composition for forming a dense layer containing a resin is applied to the laminate to impregnate the entire laminate with the resin.

[4] Precursor Sheet

In the precursor sheet of the present invention, the order of lamination of the substrate sheet, the electroconductive layer, and the dense layer is not particularly limited, and any order can be adopted, and the number of layers of each of the electroconductive layer and the dense layer is not particularly limited, and any number of layers can be adopted, but in consideration of effectively exhibiting the functions of the dense layer and the electroconductive layer described above, it is preferable that the outermost surface is constituted by the dense layer.

That is, a three-layer structure in which an electroconductive layer is laminated on one surface of a substrate sheet, and a dense layer is laminated on a surface of the electroconductive layer is one preferred aspect.

Furthermore, in consideration of further enhancing the formability of the precursor sheet and further enhancing the electroconductivity of the obtained fuel cell separator, it is preferable that electroconductive layers are formed on both side surfaces of the substrate sheet.

That is, a five-layer structure in which electroconductive layers are laminated on both side surfaces of the substrate sheet, and a dense layer is laminated on each of the surfaces of the electroconductive layers is another preferred aspect.

[5] Fuel Cell Separator

The fuel cell separator may be manufactured by heating and molding the precursor sheet of the present invention.

The molding method is preferably compression molding, but is not specifically limited thereto.

The conditions for the compression molding are not particularly limited, but the mold temperature is preferably 150 to 190° C. In a case where the paper sheet is used as the substrate sheet, the die temperature is preferably 10° C. or more lower than the melting point of the organic fiber (first organic fiber), which is more preferably 20° C. or more lower.

The molding pressure is preferably 1 to 100 MPa, and is more preferably 1 to 60 MPa.

The compression molding time is not particularly limited, and can be appropriately set to about 3 seconds to 1 hour.

The thickness of the dense layer after compression molding is not particularly limited, but is preferably 0.5 to 20 μm per layer, and 15% or less of the total thickness of the separator in the entire dense layer.

The thickness of the electroconductive layer after compression molding is preferably 20 to 150 μm per layer.

In general, a solid polymer electrolyte fuel cell is formed by juxtaposing a large number of unit cells each including a pair of electrodes sandwiching a solid polymer electrolyte membrane and a pair of separators forming a gas supply/discharge flow path sandwiching the electrodes, and the fuel cell separator of the present invention can be used as a part or all of the plurality of separators.

EXAMPLES

Hereinafter, the present invention is described more specifically with reference to Examples and Comparative Examples, but the present invention is not limited to the following Examples. Physical properties in Examples were measured by the following methods.

(1) Compression Density and Volume Resistivity of Graphite Particles 0.2 g of graphite powder was put in a cylinder with a diameter of 12 mm, and the cylinder was lightly tapped to level the surface. Subsequently, the graphite powder was gradually compressed at a constant speed of 30 N/sec with cylindrical gold-plated copper electrodes having the same diameter installed at both ends of the cylinder, and the resistance between the electrodes and filling height at the time when 3395 N (30 MPa) was reached were measured. Autograph (AG-X 10 kN manufactured by Shimadzu Corporation) was used for the compression. The resistance between the electrodes was converted from the voltage between the electrodes when applying a constant current of 1 A/cm$^2$ between the gold-plated copper electrodes, and this was taken as the volume resistivity (unit: mΩ·cm). In addition, the compression density (unit: g/cm$^3$) was calculated from the weight of the graphite powder and the filling height.

(2) Gas Impermeability of Fuel Cell Separator

A flat separator was molded, and the hydrogen gas permeation coefficient (unit: cm$^3$·cm/(cm$^2$·sec·cmHg)) was measured in accordance with JIS K7126-1: 2006 (Plastics Film and sheeting —Determination of gas-transmission rate—Part 1: Differential-pressure method). The type of the test was gas chromatography, gas impermeability was measured under the conditions of 23° C., and a test gas (hydrogen gas) on the high pressure side of 150.3 kPa.

(3) Electroconductivity of Fuel Cell Separator

A flat separator was molded, sandwiched between gold-plated copper electrodes each having a side of 2 cm, pressurized at 2.5 MPa for 10 seconds, then lowered to 1.0 MPa, and the voltage between the electrodes when applying a constant current of 1 A/cm$^2$ between the gold-plated copper electrodes was measured. The obtained voltage between the electrodes was converted into a resistance, which was defined as a penetration resistance (unit: mΩ·cm$^2$) of the separator, and electroconductivity was evaluated.

(4) Formability of Fuel Cell Separator

A separator was molded using a mold having a corrugated and convex shape, and an SEM image of a cross section was photographed. Dimensions and internal porosity were measured from the image, and consistency with the mold shape and presence or absence of voids were confirmed.

(5) Mechanical Strength of Fuel Cell Separator

A flat separator was molded, and the mechanical strength was measured by a three-point bending test in accordance with JIS K7171 under an environment of 25° C.

[1] Preparation of Substrate Sheet

Manufacturing Example 1

Eighty-seven parts by weight of graphite, 3 parts by weight of PAN-based carbon fiber, and 10 parts by weight of cellulose fiber were placed in water, and the mixture was stirred to obtain a fiber slurry. The slurry was subjected to paper making, to obtain a carbon-supported paper sheet. The obtained paper sheet was found to have a grammage of 190 g/m$^2$.

[2] Preparation of Precursor Sheet

Example 1-1

Hereinafter, the density and the volume resistivity represent values when the graphite powder was compressed at 30 MPa.

Ninety-five parts by weight of spherical graphite with a density of 1.69 g/cm$^3$ and a volume resistivity of 5.8 mΩ·cm and an average particle size of 15 μm, 5 parts by weight of polyacrylic acid (molecular weight: 1 million) as an aqueous resin as a binder resin, and water as a solvent were mixed to prepare a slurry for forming an electroconductive layer having a solid content concentration of 45% by weight. This slurry was applied to both surfaces of the substrate sheet obtained in Manufacturing Example 1 to form an electroconductive layer on each of both surfaces of the substrate sheet. The obtained electroconductive layer had a thickness of 110 μm per layer.

Subsequently, 15 parts by weight of flaky graphite with a density of 1.75 g/cm$^3$ and a volume resistivity of 24.5 mΩ·cm and an average particle size of 5 μm, 85 parts by weight of an epoxy resin, and acetone were mixed to prepare a slurry for forming a dense layer having a solid content concentration of 50% by weight. This slurry was applied to the surface of each of the two previously formed electroconductive layers to form a dense layer and impregnate the electroconductive layers with the epoxy resin, thereby obtaining a precursor sheet having a five-layer structure of dense layer/electroconductive layer/substrate sheet/electroconductive layer/dense layer. The thermosetting resin contained in the entire precursor sheet was 20% by weight. The obtained dense layer had a thickness of 10 μm per layer.

Example 1-2

A precursor sheet having a five-layer structure was obtained in the same manner as in Example 1-1 except for using spherical graphite with a density of 1.82 g/cm$^3$ and a volume resistivity of 7.6 mΩ·cm and an average particle size of 10 μm as the graphite contained in the electroconductive layer.

Example 1-3

A precursor sheet having a five-layer structure was obtained in the same manner as in Example 1-1 except for using flaky graphite with a density of 1.72 g/cm$^3$ and a volume resistivity of 26.1 mΩ·cm and an average particle size of 4 μm as the graphite contained in the dense layer.

Example 1-4

A precursor sheet having a five-layer structure was obtained in the same manner as in Example 1-1 except for using flaky graphite with a density of 1.88 g/cm$^3$ and a volume resistivity of 27.6 mΩ·cm and an average particle size of 13 μm as the graphite contained in the dense layer.

Example 1-5

A precursor sheet having a five-layer structure was obtained in the same manner as in Example 1-1 except for using spherical graphite with a density of 1.63 g/cm$^3$ and a volume resistivity of 8.2 mΩ·cm and an average particle size of 10 μm as the graphite contained in the electroconductive layer.

Example 1-6

A precursor sheet having a five-layer structure was obtained in the same manner as in Example 1-1 except for using spherical graphite with a density of 1.88 g/cm$^3$ and a volume resistivity of 5.2 mΩ·cm and an average particle size of 13 μm as the graphite contained in the electroconductive layer.

Example 1-7

A precursor sheet having a five-layer structure was obtained in the same manner as in Example 1-1 except for using spherical graphite with a density of 1.62 g/cm$^3$ and a volume resistivity of 17 mΩ·cm and an average particle size of 5 μm as the graphite contained in the electroconductive layer.

Example 1-8

A precursor sheet having a five-layer structure was obtained in the same manner as in Example 1-1 except for using spherical graphite with a density of 1.58 g/cm$^3$ and a volume resistivity of 8 mΩ·cm and an average particle size of 10 μm as the graphite contained in the electroconductive layer.

Example 1-9

A precursor sheet having a five-layer structure was obtained in the same manner as in Example 1-1 except for using spherical graphite with a density of 1.87 g/cm$^3$ and a volume resistivity of 17 mΩ·cm and an average particle size of 25 μm as the graphite contained in the electroconductive layer.

Example 1-10

A precursor sheet having a five-layer structure was obtained in the same manner as in Example 1-1 except for using spherical graphite with a density of 1.93 g/cm$^3$ and a volume resistivity of 14.5 mΩ·cm and an average particle size of 40 μm as the graphite contained in the electroconductive layer.

Example 1-11

A precursor sheet having a five-layer structure was obtained in the same manner as in Example 1-1 except for using spherical graphite with a density of 1.71 g/cm$^3$ and a volume resistivity of 12.4 mΩ·cm and an average particle size of 15 μm as the graphite contained in the electroconductive layer.

Example 1-12

A precursor sheet having a five-layer structure was obtained in the same manner as in Example 1-1 except for using spherical graphite with a density of 1.8 g/cm$^3$ and a volume resistivity of 3.8 mΩ·cm and an average particle size of 35 μm as the graphite contained in the electroconductive layer.

Example 1-13

A precursor sheet having a five-layer structure was obtained in the same manner as in Example 1-1 except for using flat graphite with a density of 1.92 g/cm$^3$ and a volume resistivity of 26 mΩ·cm and an average particle size of 20 μm as the graphite contained in the dense layer.

Example 1-14

A precursor sheet having a five-layer structure was obtained in the same manner as in Example 1-1 except for using 92 parts by weight of spherical graphite with a density of 1.69 g/cm$^3$ and a volume resistivity of 5.8 mΩ·cm and an average particle size of 15 μm as the graphite contained in the electroconductive layer, 8 parts by weight of polyvinylidene fluoride as the binder resin, and N-methylpyrrolidone (NMP) as the solvent.

Comparative Example 1-1

Without forming an electroconductive layer and a dense layer, the paper sheet obtained in Manufacturing Example 1 was impregnated with an epoxy resin to obtain a precursor sheet. The thermosetting resin contained in the entire precursor sheet was 20% by weight.

Comparative Example 1-2

The slurry for forming a dense layer used in Example 1-1 was applied to both surfaces of the paper sheet obtained in Manufacturing Example 1 to form two dense layers, thereby obtaining a precursor sheet having a three-layer structure of dense layer/substrate sheet/dense layer. The thermosetting resin contained in the entire precursor sheet was 20% by weight.

Comparative Example 1-3

A three-layer structure of electroconductive layer/substrate sheet/electroconductive layer was formed in the same manner as in Example 1-1 except that a dense layer was not formed, and then impregnated with an epoxy resin in the same manner as in Comparative Example 1-1 to obtain a precursor sheet. The thermosetting resin contained in the entire precursor sheet was 20% by weight.

Comparative Example 1-4

A precursor sheet having a five-layer structure was obtained in the same manner as in Example 1-1 except for using spherical graphite with a density of 1.62 g/cm³ and a volume resistivity of 17 mΩ·cm and an average particle size of 5 μm as the graphite contained in the dense layer.

Comparative Example 1-5

A precursor sheet having a five-layer structure was obtained in the same manner as in Example 1-1 except for using spherical graphite with a density of 1.76 g/cm³ and a volume resistivity of 8.5 mΩ·cm and an average particle size of 8 μm as the graphite contained in the dense layer.

Comparative Example 1-6

A precursor sheet having a five-layer structure was obtained in the same manner as in Example 1-1 except for using flaky graphite with a density of 1.75 g/cm³ and a volume resistivity of 24.5 mΩ·cm and an average particle size of 5 μm as the graphite contained in the electroconductive layer.

Comparative Example 1-7

A precursor sheet having a five-layer structure was obtained in the same manner as in Example 1-1 except for using flaky graphite with a density of 1.62/cm³ and a volume resistivity of 26.7 mΩ·cm and an average particle size of 2 μm as the graphite contained in the dense layer.

Comparative Example 1-8

Eighty parts by weight of spherical graphite with a density of 1.69 g/cm³ and a volume resistivity of 5.8 mΩ·cm and an average particle size of 15 μm, 20 parts by weight of an epoxy resin, and acetone as a solvent were mixed, and then vacuum-dried and pulverized to obtain a mixed powder of graphite and the epoxy resin. The mixed powder was pressure-molded into a plate shape to obtain a precursor sheet.

A summary of the above Examples and Comparative Examples is shown in Table 1.

TABLE 1

| | Dense layer | | | | Electroconductive layer | | | | | |
| --- | --- | --- | --- | --- | --- | --- | --- | --- | --- | --- |
| | Presence or absence | Density [g/cm³] | Volume resistivity [mΩ·cm] | Average particle size [μm] | Presence or absence | Density [g/cm³] | Volume resistivity [mΩ·cm] | Average particle size [μm] | Binder resin | Substrate sheet | Resin ratio [% by weight] |
| Example 1-1 | Both surfaces | 1.75 | 24.5 | 5 | Both surfaces | 1.69 | 5.8 | 15 | Aqueous | Paper sheet | 20 |
| Example 1-2 | Both surfaces | 1.75 | 24.5 | 5 | Both surfaces | 1.82 | 7.6 | 10 | Aqueous | Paper sheet | 20 |
| Example 1-3 | Both surfaces | 1.72 | 26.1 | 4 | Both surfaces | 1.69 | 5.8 | 15 | Aqueous | Paper sheet | 20 |
| Example 1-4 | Both surfaces | 1.88 | 27.6 | 13 | Both surfaces | 1.69 | 5.8 | 15 | Aqueous | Paper sheet | 20 |
| Example 1-5 | Both surfaces | 1.75 | 24.5 | 5 | Both surfaces | 1.63 | 8.2 | 10 | Aqueous | Paper sheet | 20 |
| Example 1-6 | Both surfaces | 1.75 | 24.5 | 5 | Both surfaces | 1.88 | 5.2 | 13 | Aqueous | Paper sheet | 20 |
| Example 1-7 | Both surfaces | 1.75 | 24.5 | 5 | Both surfaces | 1.62 | 17 | 5 | Aqueous | Paper sheet | 20 |
| Example 1-8 | Both surfaces | 1.75 | 24.5 | 5 | Both surfaces | 1.58 | 8 | 10 | Aqueous | Paper sheet | 20 |
| Example 1-9 | Both surfaces | 1.75 | 24.5 | 5 | Both surfaces | 1.87 | 17 | 25 | Aqueous | Paper sheet | 20 |
| Example 1-10 | Both surfaces | 1.75 | 24.5 | 5 | Both surfaces | 1.93 | 14.5 | 40 | Aqueous | Paper sheet | 20 |
| Example 1-11 | Both surfaces | 1.75 | 24.5 | 5 | Both surfaces | 1.71 | 12.4 | 15 | Aqueous | Paper sheet | 20 |
| Example 1-12 | Both surfaces | 1.75 | 24.5 | 5 | Both surfaces | 1.8 | 3.8 | 35 | Aqueous | Paper sheet | 20 |
| Example 1-13 | Both surfaces | 1.92 | 26 | 20 | Both surfaces | 1.69 | 5.8 | 15 | Aqueous | Paper sheet | 20 |
| Example 1-14 | Both surfaces | 1.75 | 24.5 | 5 | Both surfaces | 1.69 | 5.8 | 15 | Non-aqueous | Paper sheet | 20 |
| Comparative Example 1-1 | None | — | — | — | None | — | — | — | None | Paper sheet | 20 |
| Comparative Example 1-2 | Both surfaces | 1.75 | 24.5 | 5 | None | — | — | — | None | Paper sheet | 20 |
| Comparative Example 1-3 | None | — | — | — | Both surfaces | 1.69 | 5.8 | 15 | Aqueous | Paper sheet | 20 |
| Comparative Example 1-4 | Both surfaces | 1.62 | 17 | 5 | Both surfaces | 1.69 | 5.8 | 15 | Aqueous | Paper sheet | 20 |
| Comparative Example 1-5 | Both surfaces | 1.76 | 8.5 | 8 | Both surfaces | 1.69 | 5.8 | 15 | Aqueous | Paper sheet | 20 |
| Comparative Example 1-6 | Both surfaces | 1.75 | 24.5 | 5 | Both surfaces | 1.75 | 24.5 | 5 | Aqueous | Paper sheet | 20 |
| Comparative Example 1-7 | Both surfaces | 1.62 | 26.7 | 2 | Both surfaces | 1.69 | 5.8 | 15 | Aqueous | Paper sheet | 20 |

TABLE 1-continued

| | Dense layer | | | | Electroconductive layer | | | | | |
|---|---|---|---|---|---|---|---|---|---|---|
| | Presence or absence | Density [g/cm³] | Volume resistivity [mΩ · cm] | Average particle size [μm] | Presence or absence | Density [g/cm³] | Volume resistivity [mΩ · cm] | Average particle size [μm] | Binder resin | Substrate sheet | Resin ratio [% by weight] |
| Comparative Example 1-8 | None | — | — | — | One layer | 1.69 | 5.8 | 15 | None | None | 20 |

[3] Preparation of Fuel Cell Separator

Example 2-1

The precursor sheet obtained in Example 1-1 was compression-molded at 180° C. and 60 MPa for 1 minute using a planar mold and a mold having a corrugated and convex shape to obtain a fuel cell separator. The thickness of the separator molded in the planar shape was 250 μm. Among them, the thickness of the dense layer was 5 μm per layer, and the thickness of the electroconductive layer was 70 μm per layer.

Examples 2-2 to 2-14

Fuel cell separators were obtained in the same manner as in Example 2-1 except for changing to the precursor sheets prepared in Examples 1-2 to 1-14.

Comparative Example 2-1

Two precursor sheets obtained in Comparative Example 1-1 were stacked, and compression-molded at 180° C. and 60 MPa for 1 minute using a mold having a corrugated and convex shape to obtain a fuel cell separator.

Comparative Examples 2-2 to 2-8

Fuel cell separators were obtained in the same manner as in Example 2-1 except for changing to the precursor sheets prepared in Comparative Examples 1-2 to 1-8.

Gas impermeability, electroconductivity, formability, and mechanical strength of the obtained fuel cell separator were measured by the above methods, and evaluated according to the following criteria. The results are shown in Table 2.

[Gas Impermeability]
◯: The hydrogen gas permeability coefficient is less than $5.0 \times 10^{-9}$ cm³·cm/(cm²·sec·cmHg).
x: The hydrogen gas permeability coefficient is equal to or more than $5.0 \times 10^{-9}$ cm³·cm/(cm²·sec·cmHg).

[Electroconductivity]
⊚: The penetration resistance is less than 10 mΩ·cm².
◯: The penetration resistance is 10 mΩ·cm² or more and less than 13 mΩ·cm².
Δ: The penetration resistance is 13 mΩ·cm² or more and less than 15 mΩ·cm².
x: The penetration resistance is 15 mΩ·cm² or more.

[Formability]
◯: The dimensional error with the mold shape is 5% or less and the internal porosity is less than 1% at any three points.
Δ: The dimensional error with the mold shape is 5% or less and the internal porosity is 1% or more and 3% or less at any three points.
x: The dimensional error with the mold shape is 5% or more and the internal porosity is 3% or more.

[Mechanical Strength]
◯: The bending stress in a three-point bending test is 60 MPa or more.
Δ: The bending stress in a three-point bending test is 50 MPa or more and less than 60 MPa.
x: The bending stress in a three-point bending test is less than or equal to 50 MPa.

TABLE 2

| | Separator characteristics | | | |
|---|---|---|---|---|
| | Gas impermeability | Electro-conductivity | Formability | Strength |
| Example 2-1 | ◯ | ⊚ | ◯ | ◯ |
| Example 2-2 | ◯ | ⊚ | ◯ | ◯ |
| Example 2-3 | ◯ | ⊚ | ◯ | ◯ |
| Example 2-4 | ◯ | ⊚ | ◯ | ◯ |
| Example 2-5 | ◯ | ⊚ | ◯ | ◯ |
| Example 2-6 | ◯ | ⊚ | ◯ | ◯ |
| Example 2-7 | ◯ | ◯ | ◯ | ◯ |
| Example 2-8 | ◯ | ◯ | ◯ | ◯ |
| Example 2-9 | ◯ | ◯ | ◯ | ◯ |
| Example 2-10 | ◯ | Δ | ◯ | ◯ |
| Example 2-11 | ◯ | ◯ | ◯ | ◯ |
| Example 2-12 | ◯ | ◯ | ◯ | ◯ |
| Example 2-13 | ◯ | Δ | Δ | ◯ |
| Example 2-14 | ◯ | Δ | ◯ | Δ |
| Comparative Example 2-1 | X | X | X | ◯ |
| Comparative Example 2-2 | ◯ | X | X | ◯ |
| Comparative Example 2-3 | X | ◯ | ◯ | ◯ |
| Comparative Example 2-4 | X | ◯ | ◯ | ◯ |
| Comparative Example 2-5 | X | ◯ | ◯ | ◯ |
| Comparative Example 2-6 | ◯ | X | X | ◯ |
| Comparative Example 2-7 | X | X | ◯ | ◯ |
| Comparative Example 2-8 | X | ◯ | ◯ | X |

As shown in Table 2, it can be seen that the fuel cell separators obtained in Examples 2-1 to 2-14 are excellent in gas impermeability and electroconductivity, and are also excellent in formability, whereas the fuel cell separators obtained in Comparative Examples 2-1 to 2-3 without a dense layer and/or an electroconductive layer, the fuel cell separators obtained in Comparative Examples 2-4 to 2-7 in which the characteristics of graphite are out of the scope of the present invention, and the separator for fuel cell obtained in Comparative Example 2-8 composed of only an electroconductive layer are inferior in any one or all of the above-mentioned separator characteristics.

The invention claimed is:
1. A precursor sheet for fuel cell separator comprising: an electroconductive substrate sheet, a dense layer containing first graphite particles, and an electroconductive layer containing second graphite particles, wherein the dense layer and the electroconductive layer contain a resin, the first graphite particles have a bulk density of 1.7 g/cm$^3$ or more and a volume resistivity of 20 mΩ·cm or more when compressed at 30 MPa, and the second graphite particles have a bulk density of 1.5 g/cm$^3$ or more and a volume resistivity of less than 20 mΩ·cm when compressed at 30 MPa.

2. The precursor sheet for fuel cell separator according to claim 1, wherein the electroconductive layer is laminated on one surface of the substrate sheet, and the dense layer is laminated on a surface of the electroconductive layer.

3. The precursor sheet for fuel cell separator according to claim 2, wherein the electroconductive layer is laminated on each of both side surfaces of the substrate sheet, and the dense layer is laminated on each of the surfaces of the electroconductive layers.

4. The precursor sheet for fuel cell separator according to claim 1, wherein the first graphite particles are flat graphite with an average particle size of 1 to 30 μm.

5. The precursor sheet for fuel cell separator according to claim 4, wherein the first graphite particles are flat graphite with a bulk density of 1.7 to 1.9 g/cm$^3$ and a volume resistivity of 20 to 30 mΩ·cm when compressed at 30 MPa.

6. The precursor sheet for fuel cell separator according to claim 1, wherein the second graphite particles are graphite having an isotropic shape with an average particle size of 5 to 50 μm.

7. The precursor sheet for fuel cell separator according to claim 6, wherein the second graphite particles are spherical graphite with a bulk density of 1.5 to 1.9 g/cm$^3$ and a volume resistivity of 10 mΩ·cm or less when compressed at 30 MPa.

8. The precursor sheet for fuel cell separator according to claim 1, wherein the dense layer has a thickness of 5 to 30 μm.

9. The precursor sheet for fuel cell separator according to claim 1, wherein the electroconductive layer has a thickness of 10 to 200 μm.

10. The precursor sheet for fuel cell separator according to claim 1, wherein the resin of either or both of the electroconductive layer and the dense layer contains a thermosetting resin.

11. The precursor sheet for fuel cell separator according to claim 1, wherein the resin of the electroconductive layer contains an aqueous resin.

12. The precursor sheet for fuel cell separator according to claim 1, wherein the substrate sheet contains a resin.

13. The precursor sheet for fuel cell separator according to claim 12, wherein the resin of the substrate sheet contains a thermosetting resin.

14. The precursor sheet for fuel cell separator according to claim 10, wherein the thermosetting resin is contained in an amount of 10 to 25% by weight in the entire precursor sheet for fuel cell separator.

15. The precursor sheet for fuel cell separator according to claim 1, wherein the substrate sheet is a paper sheet containing organic fibers and graphite.

16. A fuel cell separator obtained by molding the precursor sheet for fuel cell separator according to claim 1.

17. The fuel cell separator according to claim 16, wherein the dense layer has a thickness of the entire dense layer after molding of 15% or less of a total thickness.

18. The fuel cell separator according to claim 16, wherein the electroconductive layer has a thickness per layer after molding of 20 to 150 μm.

19. A fuel cell comprising the fuel cell separator according to claim 16.

20. A method for manufacturing a precursor sheet for fuel cell separator comprising an electroconductive substrate sheet, a dense layer containing first graphite particles, and an electroconductive layer containing second graphite particles, the method comprising the steps of:

applying a composition for forming an electroconductive layer containing the second graphite particles and a resin to at least one surface of the substrate sheet or a surface of the dense layer to form the electroconductive layer; and applying a composition for forming a dense layer containing the first graphite particles and a resin to at least one surface of the substrate sheet or a surface of the electroconductive layer to form the dense layer, wherein the first graphite particles have a bulk density of 1.7 g/cm$^3$ or more and a volume resistivity of 20 mΩ·cm or more when compressed at 30 MPa, and the second graphite particles have a bulk density of 1.5 g/cm$^3$ or more and a volume resistivity of less than 20 mΩ·cm when compressed at 30 MPa.

21. The method for manufacturing a precursor sheet for fuel cell separator according to claim 20, comprising the steps of applying the composition for forming an electroconductive layer to both surfaces of the substrate sheet to form two electroconductive layers; and applying the composition for forming a dense layer to the respective surfaces of the two electroconductive layers to form two dense layers.

22. A method for manufacturing a fuel cell separator, comprising compression-molding the precursor sheet obtained by the method for manufacturing a precursor sheet for fuel cell separator according to claim 20.

* * * * *